United States Patent [19]

Jackovitz et al.

[11] 4,029,132
[45] June 14, 1977

[54] METHOD OF PREPARING HIGH CAPACITY NICKEL ELECTRODE POWDER

[75] Inventors: John F. Jackovitz, Monroeville; Earl A. Pantier, Verona, both of Pa.

[73] Assignee: Westinghouse Electric Corporation, Pittsburgh, Pa.

[22] Filed: May 24, 1976

[21] Appl. No.: 689,624

[52] U.S. Cl. .................. 141/1.1; 141/36; 252/425.3; 429/223; 252/182.7
[51] Int. Cl.² .................. H01M 4/32; H01M 4/52
[58] Field of Search .................. 252/182.1, 425.3; 75/119; 106/306; 141/1.1, 36; 429/218, 223

[56] References Cited
UNITED STATES PATENTS

| | | | |
|---|---|---|---|
| 3,520,733 | 7/1970 | Buckland et al. | 252/182.1 |
| 3,899,350 | 8/1975 | Jackovitz et al. | 252/182.1 |
| 3,928,068 | 12/1975 | Jackovitz et al. | 429/223 |
| 3,941,614 | 3/1976 | Jackovitz et al. | 252/182.1 |
| 3,951,686 | 4/1976 | Kramer et al. | 429/223 |

*Primary Examiner*—Richard E. Schafer
*Assistant Examiner*—Irwin Gluck
*Attorney, Agent, or Firm*—D. P. Cillo

[57] ABSTRACT

A battery electrode plate is made by loading a supporting porous metallic plaque with active battery material made by: (1) hydrolyzing the reaction product of a fuse-melted starting material comprising an admixture of nickel oxide, sodium peroxide and an amount of an oxide containing, alkali metal, non-reactive flux material effective to allow a melt-fusion reaction of the starting material at temperatures of between about 650° C to about 925° C, the hydrolyzed solid reaction product containing electrochemically active nickel hydrated oxides and hydroxide forms, (2) if desirable, drying the product below about 65° C, and (3) preferably adding, at some step in the method, an amount of cobalt containing additive effective to provide about 2 wt.% to about 10 wt.% cobalt in the active battery material based on nickel oxide plus cobalt content.

20 Claims, 2 Drawing Figures

METHOD OF PREPARING HIGH CAPACITY NICKEL ELECTRODE POWDER

BACKGROUND OF THE INVENTION

The fusion of metallic nickel with sodium dioxide was reported in 1896 by W.L. Dudley in 18 *J. Am. Chem. Soc.* 901. Dudley fused sodium dioxide in a nickel crucible with nickel metal at a cherry-red heat, about 700° C to 800° C, for about 1 hour. After cooling, the contents were submerged in water. The brown crystals formed were washed to remove alkali. The crystals were then dried at 110° C. The crystals were analyzed and believed to be the dihydrate $Ni_3O_4\cdot 2H_2O$, with 0.7 wt.% cobalt as an impurity. A cobalto-cobaltic dihydrate $Co_3O_4\cdot 2H_2O$ was also described as obtained by exposing to moist air $Co_3O_4$, prepared by heating cobalt carbonate. These materials were believed to be new compounds but no active battery material or electrochemical use was suggested.

Jackovitz and Pantier, in U.S. Pat. No. 3,941,614, discovered a process which would provide an improved activated battery material, by chemically reacting NiO with effective amounts of $Na_2O_2$, generally at melt fusion temperatures of about 950° C to 1,025° C, to form $NaNiO_2$, which was then hydrolyzed to form $Ni(OH)_2$. Due to the high temperatures involved, the fusion reaction was conducted in a nickel reaction vessel.

Preparing $Ni(OH)_2$ by starting with nickel metal, would require a prolonged oxidation step, sure to degrade the reaction vessel. The Jackovitz and Pantier process, while eliminating the prolonged oxidation step by starting with NiO, still required relatively large amounts of $Na_2O_2$ and still caused some corrosion of the very expensive nickel reaction vessel required in the melt-fusion step.

There is a need then for an improved method of making $Ni(OH)_2$ active battery material from inexpensive NiO, at lower temperatures and requiring less $Na_2O_2$, so that less expensive alumina, porcelain, etc. reaction vessels can be used repeatedly, with resultant savings in a commercial operation.

SUMMARY OF THE INVENTION

We have discovered a process that will provide an improved activated battery material mixture, by chemically fuse-melt reacting: a starting material containing NiO, which may also have added to it about 2 wt.% to about 10 wt.% of Co, based on NiO plus Co content, as a material selected from Co, CoO, $Co_2O_3$, $Co_3O_4$ or mixtures thereof; effective amounts of $Na_2O_2$, generally within a weight ratio of $NiO:Na_2O_2$ of 1:1.20 to 1:1.60; and including an amount of an oxide containing, alkali metal (Group 1A) fluxing agent soluble in and effective to allow a melt-fusion reaction of the starting material at temperatures between about 650° C to about 925° C, without entering into the reaction itself. The preferred fluxing materials are alkali metal molybdates, tungstates, vanadates, carbonates and nitrates selected from the group consisting of $Na_2MoO_4$, $K_2MoO_4$, $Li_2MoO_4$, $Na_2WO_4$, $K_2WO_4$, $Li_2WO_4$, $Na_3VO_4$, $K_3VO_4$, $Li_3VO_4$, $Na_2CO_3$, $K_2CO_3$, $Li_2CO_3$, $NaNO_3$, $KNO_3$, $LiNO_3$ and their mixtures, generally within a weight ratio of NiO:-flux material of about 1:0.5 to about 1:3.0. This nickel oxide-sodium peroxide-flux mixture is heated at temperatures between about 650° C to about 925° C, for a period of time, generally about ½ to 5 hours, effective to form $NaNiO_2$ or $NaNiO_2$ plus $NaCoO_2$ melted reaction product.

The reaction product, comprising $NaNiO_2$, is then hydrolyzed. If the cobalt oxide or elemental cobalt additive was not added initially, before fusion, as is preferred, it will be added generally as cobalt hydroxide after hydrolysis, or as a water soluble cobalt salt such as cobalt chloride or cobalt nitrate during hydrolysis, after hydrolysis or after plaque loading.

This process will provide a final solid active battery material containing over about 97 wt.% solid Ni hydrated oxides and hydroxide forms and Co hydroxide forms, the remainder being interlaminar sodium. It is important that about 0.5 wt.% to about 3 wt.% unreacted $NaNiO_2$ be present after hydrolysis and drying. The unreacted $NaNiO_2$ is present, in the active material as interlaminar sodium in the nickel oxy-hydroxide layers and helps prevent swelling of the active material in the plate during the life of the battery.

Aqueous alkali metal hydroxide formed can be drawn off in some continuous fashion and concentrated into a saleable product such as battery electrolyte, or used as a basic material for neutralizing mine acid pools and the like. The flux material, since it does not react, can be recovered and substantially all of it reused, so that its inclusion in the reaction does not add materially to production costs.

Since temperatures below about 925° C, times below about 5 hours and minimal amounts of $Na_2O_2$ are used in the melt fusion step, alumina, porcelain, etc. reaction vessels can be used repeatedly, with substantial cost savings. Starting with nickel oxide, which is the least expensive nickel containing material commercially available, assures that the process is commercially and economically feasible.

This activated battery material is washed and generally dried after which it can then be loaded into a supporting porous plaque to provide an electrode plate, which may then be electrochemically cycled or "formed" (electrically charged and discharged in an alkaline electrolyte), prior to use in a battery opposite a suitable negative electrode. The drying step is generally carried out at temperatures below about 65° C, or at a suitable temperature in a high moisture atmosphere, so that water present in the battery material structure is not eliminated to an extent to cause the material to lose activity.

BRIEF DESCRIPTION OF THE DRAWINGS

For a better understanding of the invention, reference may be made to the preferred embodiments exemplary of the invention, shown in the accompanying drawings in which.

DESCRIPTION OF THE PREFERRED EMBODIMENTS

One embodiment of a battery, utilizing the improved active material and electrode plate of this invention, would generally comprise a plurality of alternate positive nickel plates and negative plates such as, for example, loaded iron active material plates. This stack-up would contain plate separators between the positive and negative plates, all contacted by alkaline electrolyte and housed in a case having a cover, a vent, and positive and negative terminals.

Figure 2:
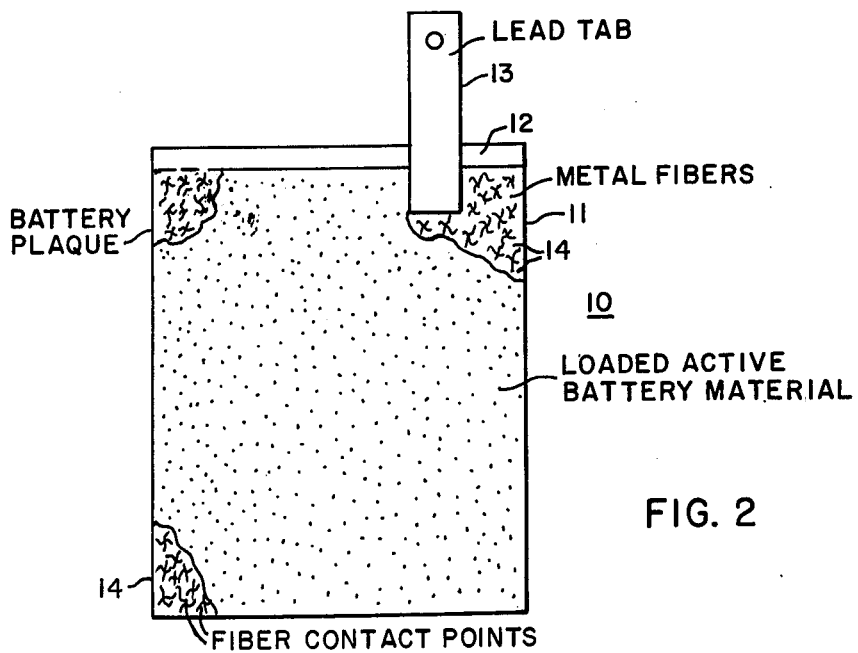
FIG. 2 shows a preferred electrode plate loaded with the active battery material of this invention.

Preferred electrode plates, shown in FIG. 2, are made from metal fibers, preferably nickel, or metal protective coated fibers, such as nickel coated steel or iron. A very suitable material is nickel coated steel wool. The plaque 10, is a flexible, expansible, compacted sheet of relatively smooth, generally contacting, intermingled, metal fibers as shown at 11 in the body of the plaque. The plaque has, in the embodiment shown, top edge 12 coined to a high density.

The coined area provides a base to which lead tab 13, which is attached to the battery terminals, is spot welded. The plaque is generally between about 90% and 95% porous. This range is preferable in providing improved conductivity and electrolyte permeability, while maintaining enough body for good plaque loading. Activated nickel electrode material is loaded into the interstices of the body of this fibrous plaque to provide an electrode plate. This invention, however, is not restricted to the preferred plaque structure described herein, and the active material can be used with other metallic plaque structures.

The metal fibers are preferably diffusion bonded in a protective atmosphere at temperatures up to the sintering point of the fibers used. In diffusion bonding, the fibers must not be melted, or protuberances will be formed reducing active material loading (volume) within the plaque. There should only be a metallurgical bond and interdiffusion of atoms across the fiber interface at fiber contact points 14 along the fiber lengths. Diffusion bonding provides a flexible, expansible electrode structure having a large pore volume into which active material can be pasted or otherwise impregnated. Diffusion bonding also lowers the electrode plate resistance appreciably and thus the internal cell resistance in a finished cell.

The active material is prepared by mixing the nickel oxide (NiO), sodium peroxide ($Na_2O_2$) and a selected flux material, and then heating the admixture. These materials are generally in powdered or particulate form. The starting material preferably contains between about 2 wt.% to about 10 wt.% cobalt, based on NiO plus Co, added as elemental cobalt or preferably as a cobalt oxide such as $Co_2O_3$, $Co_3O_4$, CoO or their mixtures. These materials are preferred to be of moderate to high purity. They are fused and melted, generally in a suitable container, for example an alumina or porcelain reaction vessel, in air or an inert atmosphere, in an oven maintained at a temperature of between about 650° C to about 925° C, for about ½ to about 5 hours.

It is essential in terms of a commercial process to use the oxidized nickel (NiO) as starting material, since otherwise long oxidation of Ni to NiO will seriously degrade and ruin the reaction container. A selected fluxing and ion transport material is used to promote and catalyze the fusing of the nickel oxide and sodium peroxide. The fluxing material is non-reactive with the NiO-$Na_2O_2$ in the process at melt-fusion temperatures between about 650° C to about 925° C and can be recovered and reused. It is non-reactive at these temperatures due to refractory metal oxide, carbonate or nitrate inclusion. It allows the use of less $Na_2O_2$ than the prior art processes and a reduction of the melt-fusion temperature by about 200° C.

Useful oxygen-containing, alkali metal, nonreactive flux material which are soluble in the reactants at about 650° C and effective to allow NiO-$Na_2O_2$ melt-fusion between about 650° C to about 925° C are preferably alkali metal molybdates, tungstates, vanadates, carbonates and nitrates selected from the group consisting of $Na_2MoO_4$, $K_2MoO_4$, $Li_2MoO_4$, $Na_2WO_4$, $K_2WO_4$, $Li_2WO_4$, $Na_3VO_4$, $K_3VO_4$, $Li_3VO_4$, $Na_2CO_3$, $K_2CO_3$, $Li_2CO_3$, $NaNO_3$, $KNO_3$, $LiNO_3$ and mixtures thereof. The most preferred flux materials are $Na_2MoO_4$, $K_2MoO_4$, $Na_2CO_3$, $K_2CO_3$, $NaNO_3$, $KNO_3$ and mixtures thereof. Rubidium and cesium could be used in the flux materials, but at this time are extremely expensive. The use of these mixed metal oxides of alkali metals and molybdenum, tungsten and vanadium refractory metals, and alkali metal carbonates and nitrates provides a consistent product. Use of other materials, such as, for example halides or sulfides will cause substitutions for the oxygen in NiO and result in a material having poor electrical properties and a reaction generating harmful by-products which are difficult to separate. Chromates have been found to be ineffective in promoting melt-fusion within the temperature range of this invention.

In the reaction, the sodium peroxide decomposes to form $Na_2O$ which oxidizes the NiO. A high capacity, easily pasteable active battery material is formed when the reaction product is then hydrolyzed, generally by immersion in water, to cause a decomposition reaction and formation of Ni hydrated oxides and Ni hydroxide forms and cobalt hydroxide. The active material is generally filtered, washed until neutral to litmus and then may be dried at a temperature that will not degrade activity, e.g., between about 15° C to about 65° C. The NaOH in the filtrate can be drawn off in some continuous fashion and concentrated by evaporation, for example, into a saleable product. The filtrate will also contain the unreacted flux material, such as $NaMoO_4$, which can be recovered as by evaporation, for example, and then dried and reused for subsequent preparations. During the melt-fusion step, reaction vessels will only lose from 0.3% to 1% of their original weight. They will not be degraded or corroded and can be reused for at least about 10 to 20 additional batch reactions.

A set of equations which in part describes the basic preferred fusion and hydrolysis reactions, using CoO and $NaMoO_4$ as preferred examples of cobalt and flux materials, can be given as:

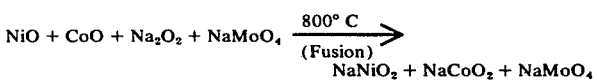

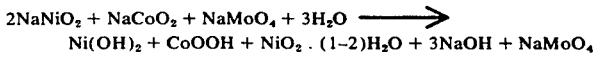

We found, in accordance with the prior art, that cobalt addition was preferred at some step in the method to provide an active material in the electrode plate which would have superior electrochemical performance, i.e., a capacity of about 0.20 amp.-hr./gm. active material, after 25 cycles.

The cobalt, in the form of elemental Co or cobalt oxide is added preferably before the fusion step, but cobalt additive may be added instead to the paste after the hydrolysis step, generally as cobalt hydroxide Co-$(OH)_2$, prior to incorporation into the plaque. When cobalt additive is added as elemental cobalt or as a cobalt oxide, before fusion, the active material contains cobalt (III) hydroxide; if added in a Co hydroxide form after hydrolysis, the active material contains cobalt (III) hydroxide. Cobalt hydroxide is expensive and when added after hydrolysis does not provide completely homogeneous mixing.

Generally the nickel hydrated oxides and hydroxide forms will be washed to remove most of the NaOH and the cobalt hydroxide may be added as an aqueous slurry; or the nickel material may be dried and the cobalt hydroxide mixed with it in a suitable mill or other type mixer. Also, during or after hydrolysis, aqueous cobalt chloride ($Co(Cl)_2 \cdot 6H_2O$) or cobalt nitrate ($Co(NO_3)_2 \cdot 6H_2O$) additive may be used, in which case after reaction with alkaline hydroxide present or added, the final active material will contain cobalt (II) hydroxide, $Co(OH)_2$. Addition of an appropriate amount of cobalt nitrate solution to the alkaline slurry after hydrolysis results in a fairly uniform dispersion of $Co(OH)_2$ precipitate with the nickel active material.

The plaque can also be loaded with battery material not containing cobalt, and then dipped for an effective period of time in aqueous cobalt nitrate or chloride solution, dried, and finally dipped in alkali hydroxide, such as KOH, NaOH or LiOH, to provide a precipitate of $Co(OH)_2$ in the material. This would also provide a useful method to upgrade the cobalt content of loaded plaques.

In all cases, cobalt addition is preferred, and the total weight percent of cobalt, as Co in the active material, must be between about 2 wt.% to about 10 wt.% and preferably between about 5 wt.% to about 8 wt.% of the initial weight of NiO plus Co, i.e. wt.% Co = (Co/(NiO + Co). Cobalt concentration below 2 wt.% and above 10 wt.% will detract from acceptable performance. A useful active material can be made without containing cobalt, but a plate containing such material, before being used in a battery, should be dipped in a cobalt solution to insure obtaining higher electrochemical performance.

We found that the weight ratio of NiO to $Na_2O_2$ was critical in providing an electrode plate having acceptable electrochemical performance. The weight ratio of NiO:$Na_2O_2$ must be between about 1:1.20 to about 1:1.60. An amount of $Na_2O_2$ less than about 1.20 parts per 1 part NiO would provide relatively poor performance. A 1:1 weight ratio of NiO:$Na_2O_2$ provided a mixture that remained in slurry form with incomplete reaction and provided capacity values of only about 0.15 amp.-hr./gm. active material. An amount of $Na_2O_2$ over about 1.60 parts per 1 part NiO can cause destruction of the reaction vessels, and does not provide notably increased electrochemical capacity. The weight ratio of NiO:flux material should be between about 1:0.5 to about 1:3.0. An amount of flux less than about 0.5 part per 1 part NiO would not substantially lower the melt fusion temperature below 925° C.

The useful temperature range for complete fusion-reaction, to be maintained after heating the oven, is between about 650° C to about 925° C. The preferred fusion-reaction temperature range, to be maintained after heating the oven, is from about 700° C to about 900° C. The time necessary for fusion will vary depending on temperature. At 650° C to 800° C, 3 to 5 hours is generally sufficient for complete reaction, while at 850° C to 925° C, less time is required for optimum reaction. The best performance was observed at a fusion-reaction temperature of 900° C for ½ hour.

The water temperature for the hydrolysis reaction of the $NaNiO_2$ can be between about 10° C to about 95° C, but preferably between about 20° C to about 35° C. The molten $NaNiO_2$ can be quenched in water in $NaNiO_2$ temperatures below about 600° C, i.e., the $NaNiO_2$ can be cooled to below 600° C and then immersed in water; this however produces a very active hydrolysis, and it is preferred to cool the $NaNiO_2$ to between 20° C to 95° C before hydrolysis. Also of particular advantage in this method, NaOH solution is produced which may be further used as a battery electrolyte.

The final active material will contain nickel hydrated oxides and hydroxide forms plus cobalt hydroxide. It will also contain about 0.5 wt.% to about 3 wt.%, but generally about 2 wt.% unhydrolyzed or unreacted $NaNiO_2$, based on dried nickel hydrated oxides and hydroxides plus cobalt hydroxide forms. This sodium material imparts important reduced swelling properties. The active material is then washed and dried. This material can be made into a high density fluid active battery paste for application to battery plaques.

The active material after drying up to 65° C contains water molecules between spaced —O—Ni—O— layers. It is essential that the water remain in the structure. Therefore, drying is of a partial nature and must be accomplished at a temperature and humidity effective to retain an optimum amount of the interlaminar $H_2O$. Generally the temperature limits are between about 15° C to 65° C with a preferred range of 20° C to 40° C. Above 65° C drying and the electrochemical activity starts to decrease. Above 100° C drying, the electrochemical activity continues to decrease to the extent that the material starts to become inactive. Above 130° C involves complete drying and the cubic NiO electrochemically inactive state is formed.

For simplicity, one of the nickel hydroxide forms comprising the final hydrated active material has been written as nickel (III) hydroxide. This is a simplified way of stating an average between Ni (II) and Ni (IV) hydroxides. There is considerable speculation as to the precise formula of the higher valent, oxidized nickel hydroxide. Analysis of hydrolyzed $NaNiO_2$ obtained using the dimethylglyoxime gravimetric technique indicates that a primary nickel compound corresponds to a stoichiometry of $Ni_3O_4 \cdot 2H_2O$, a nickel oxide hydrate. For the purposes of this application, the term nickel (III) hydroxide and nickel hydrated oxides and hydroxide forms will be used to identify the electrochemically active nickel compound obtained by the substantially complete chemical hydrolysis reaction of $NaNiO_2$.

The sodium peroxide, nickel oxide, cobalt and cobalt oxide starting materials, as well as cobalt hydroxide and water soluble cobalt salt additives are preferred to be substantially pure, i.e., no more than about 5% of electrochemically harmful impurities that cannot be washed away. Fortunately, commercial grades of black nickel oxide powder are sufficiently pure to be used as supplied.

EXAMPLE 1

An electrode powder active battery material, Sample 1(a), containing about 98 wt.% cobalt · nickel hydroxide was mixed by placing in a container and thoroughly blending: 9.4 grams (0.126 mole) of 99+% pure, finely divided black nickel oxide, NiO, and 0.60 gram (0.080 mole) of 99% pure cobalt, mostly in the form of CoO, (containing 70 wt.% or about 0.42 gram Co) with 14.0 grams (0.18 mole) of C.P. (96.5% chemically pure) grade sodium peroxide, $Na_2O_2$ and 10.0 grams (0.049 mole) $Na_2MoO_4$ as a flux material. The nickel oxide consisted essentially of NiO and was commercially available as INCO black NiO; the cobalt oxide comprised mostly CoO and was commercially available as BAKER reagent cobalt oxide. This admixture provided approximately a 4.3 wt.% cobalt concentration based on nickel oxide plus cobalt content, i.e., 0.42 gm. Co divided by (9.4 gm. NiO + 0.42 gm. Co); and a weight ratio of $NiO:Na_2O_2$:flux material of about 1:1.49:1.06.

This admixture was then placed in an alumina crucible and gradually heated for about 1 hour up to about 800° C in air, in a ceramic lined oven with Nicrome heating coils. Temperatures were monitored using a Pt-PtRh thermocouple introduced at the rear of the oven. After the oven was heated up to 800° C, the temperature was increased and maintained at a fusion-reaction temperature of about 900° C for ½ hour, to ensure complete chemical melt-fusion reaction to a substantially pure $NaNiO_2$ + $NaCoO_2$ mixture.

The crucible and reaction product contents were then cooled to about 25° C over a 6 hour period, after which the crucible containing a solid mass of material was immersed in a 250 ml. beaker of water at about 25° C. The contents hydrolyzed over a 12 hour period, and dispersed in the water to provide an active battery material powder containing about 98 wt.% reacted oxide hydrates and hydroxides with about 2 wt.% sodium on a dried basis as unreacted $NaNiO_2$. The heavy brown-black solid active material settled immediately in the beaker and was separated using a conventional Buchner apparatus. It was washed with successive 100 ml. portions of water until neutral to litmus. This provided a dense brown-black crystalline powder material. The alumina crucible was not at all degraded by the reaction although it lost about 0.5% of its original weight during the reaction. The filtrate consisted of NaOH solution containing $Na_2MoO_4$. The $Na_2MoO_4$ initially added does not react and substantially all of it was recovered by evaporation and could be reused.

This active battery powder was then air dried at only 25° C, so as not to eliminate interlaminar water in the crystals, and sieved to −325 mesh, i.e., about 98% of the powder had a diameter of less than about 44 microns. This powder was then loaded into nickel battery plaques or grids. The grids were 90% to 95% porous, 100 mil thick, diffusion bonded, nickel plated steel wool fiber plaques, having an area of about 1 sq. in. They were loaded using a conventional suction platform. An aqueous slurry of the active material was made to provide a high density fluid paste which was added from a blender until the plaques were filled. Additional water was dropped onto the loaded electrode plates from a funnel to obtain optimum packing within the plaque support.

Electrode Sample 1(a), having an initial thickness of about 100 mils, was then pressed at about 20,000 lb./sq. in., to a final thickness approximating 60 mils. The loading in the plaque was about 1.8 gm./sq. in. of plaque surface area.

The nickel electrode of Sample 1(a) was set opposite negative electrodes, and contacted with electrolyte to form an electrochemical cell. The nickel hydroxide electrode was "formed", i.e., charge and discharge cycled versus sintered cadmium electrodes of considerably larger size and capacity. They were charged for about 2¼ hours at a current density of about 250 mA/sq. in., in 25 wt.% aqueous KOH, and discharged through a 10 ohm resistor at a current density of approximately 120 mA/sq. cm., in 25 wt.% aqueous KOH electrolyte. The amount of charge for each cell was adjusted to about 250% of the theoretical nickel capacity based on a single electron transfer per nickel atom.

The cycling increases the porosity of the electrode, allowing increased electrolyte penetration and higher electrical output. Initially, the active material is tightly packed and the electrolyte is restricted from contacting the interior of the electrode. An electrode is ready for use after "forming" for about 10 to 35 cycles. The active material after "formation" did not show any appreciable swelling in the battery electrode plate.

Figure 1:
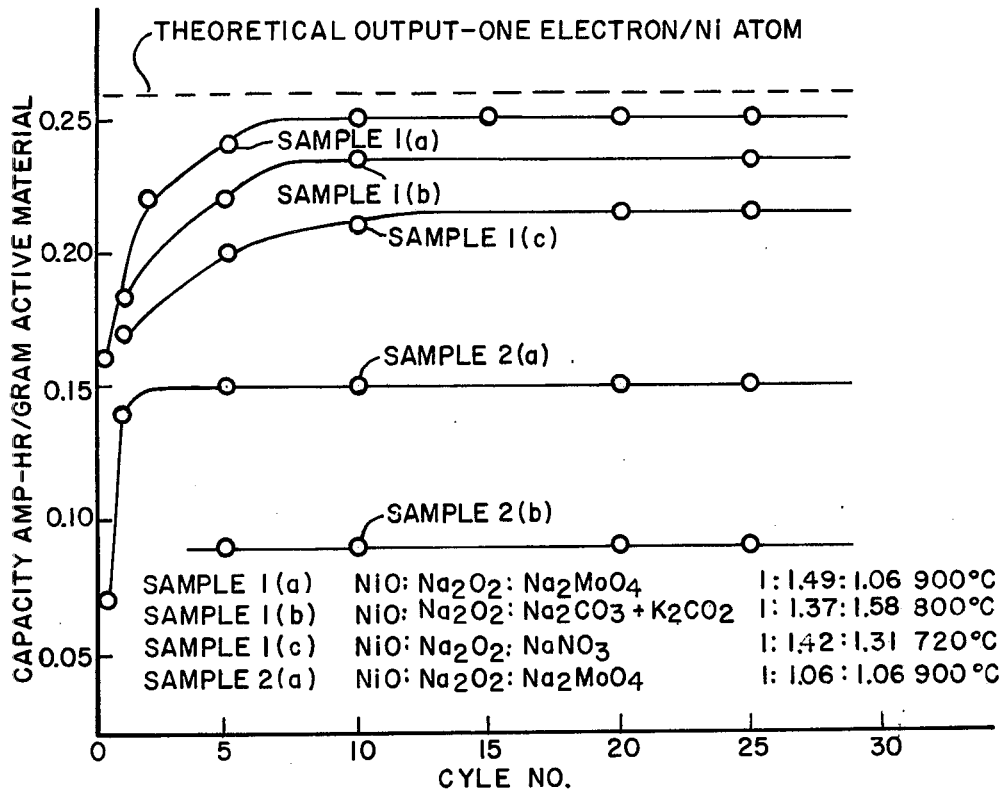
FIG. 1 is a graph showing the performance of the Example 1 and 2 electrode plates, in terms of capacity vs. cycle number, in relation to the theoretical capacity value.

Capacity values which we considered acceptable for nickel hydroxide battery material were over about 0.20 amp.-hr./gram active material after 25 cycles. This would provide an active battery material highly effective in approaching theoretical values. Theoretical values for one-electron transfer, are about 0.25 amp.-hr./gram, shown on FIG. 1 as a broken horizontal line. The capacity of the electrode made by the method described above are also shown on FIG. 1. Sample 1(a) provided a capacity at 25 cycles of about 0.25 amp.-hr./gram.

Electrode powder active battery material, Samples 1(b), and 1(c) containing about 98 wt.% reacted oxide hydrates and hydroxide forms were made in a porcelain crucible by following exactly the same procedure as described above for Sample 1(a), except that for Sample 1(b): 19.0 grams of 99+% pure, finely divided INCO black nickel oxide, NiO, was thoroughly blended with 1.0 gram of 99% pure BAKER reagent cobalt oxide, CoO, (containing 0.7 gram Co), 26.0 grams of C.P. grade sodium peroxide, $Na_2O_2$ and a mixture of 15.0 grams of $Na_2CO_3$ and 15.0 grams of $K_2CO_3$ flux material. This admixture provided approximately a 3.5 wt.% cobalt concentration based on nickel oxide plus cobalt content, and a weight ratio of $NiO:Na_2O_2$:flux material of about 1:1.37:1.58. The admixture was heated for about 1 hour up to about 600° C in air, and then the temperature was increased and maintained at a fusion-reaction temperature of about 800° C for 3 hours, to ensure a substantially complete chemical melt-fusion reaction.

For Sample 1(c): 19.0 grams of 99+% pure, finely divided INCO black nickel oxide, NiO, was thoroughly blended with 1.0 gram of 99% BAKER reagent cobalt oxide, CoO, (containing 0.7 gram (Co), 27.0 grams of C.P. grade sodium peroxide, $Na_2O_2$ and 25.0 grams of $NaNO_3$ flux material. This admixture provided approximately a 3.5 wt.% cobalt concentration based on nickel oxide plus cobalt content, and a weight ratio of $NiO:Na_2O_2$:flux material of about 1:1.42:1.31. The admixture was heated for about 1 hour up to about 600° C in air and then the temperature was increased and maintained at a fusion-reaction temperature of about 720° C for 3 hours to ensure a substantially complete chemical melt-fusion reaction.

The reactive battery powder of Samples 1(b) and 1(c) was air dried at 25° C, sieved, loaded into plaques, pressed to about 1.8 gram/sq. in. loading and "formed" as described for Sample 1(a) above. Sample 1(b) provided a capacity at 25 cycles of about 0.235 amp.-hr./gm. Sample 1(c) provided a capacity at 25 cycles of about 0.215 amp.-hr./gm. In all cases, the alumina and porcelain reaction vessels could be reused for at least 10 to 20 more batch reactions. The Sample 1(a), 1(b)

and 1(c) electrode plates were shown to be especially useful for battery operation.

EXAMPLE 2

For comparative purposes, electrode powder material, Samples 2(a) and 2(b), were made in an alumina crucible by following exactly the same procedure as described above for Sample 1(a), except that for Sample 2(a), 10.0 grams of C.P. grade sodium peroxide, $Na_2O_2$, was used. This admixture provided approximately a 4.3 wt.% cobalt concentration based on nickel oxide plus cobalt content, and a weight ratio of NiO:-$Na_2O_2$:flux material of about 1:1.06:1.06. The fusion reaction temperature was held at about 900° C for ½ hour. The alumina crucible was not at all degraded although it lost 0.5% of its original weight during the reaction.

For Sample 2(b), no sodium peroxide, $Na_2O_2$, was used. This admixture provided approximately at 4.3 wt.% cobalt concentration based on nickel oxide plus cobalt content, and a weight ratio of NiO:$Na_2O_2$:flux material of about 1:0:1.06. The fusion reaction was held at about 900° C for ½ hour. The alumina crucible was not at all degraded and lost only 0.3% of its original weight during the reaction.

The electrode powder of Samples 2(a) and 2(b) was air dried at 25° C, sieved, loaded into plaques, pressed to about a 1.8 gm./sq. in. loading and "formed" as described above for Sample 1(a). Sample 2(a) provided a capacity at 25 cycles of about 0.15 amp.-hr./gm. Sample 2(b) provided a capacity at 25 cycles of about 0.09 amp.-hr./gm. Sample 2(a), with a very low NiO:$Na_2O_2$ weight ratio, remained in slurry form with incomplete reaction and Sample 2(b), without any $Na_2O_2$, did not show any evidence of being useful as a battery active material.

We claim as our invention:

1. A method of producing a battery electrode plate containing active battery material, comprising the steps of:
    a. mixing NiO and $Na_2O_2$ in a weight ratio of NiO:-$Na_2O_2$ of between about 1:1.20 to about 1:1.60 with an amount of an oxygen containing alkali metal fluxing material selected from the group consisting of alkali metal molybdates, alkali metal tungstates, alkali metal vanadates, alkali metal carbonates, alkali metal nitrates and mixtures thereof, effective to allow fuse-melting of the NiO and $Na_2O_2$ at temperatures of between about 650° C to about 925° C;
    b. heating the mixture of NiO, $Na_2O_2$ and fluxing material between about 650° C to about 925° C to melt-fuse the mixture and to form $NaNiO_2$;
    c. hydrolyzing the $NaNiO_2$ in water at between about 20° C to about 95° C to form active battery material;
    d. maintaining the activity of the battery material by maintaining the temperature of the material below about 65° C; and
    e. applying the battery material to a porous metallic plaque.

2. The method of claim 1 wherein the fluxing material is selected from the group consisting of $Na_2MoO_4$, $K_2MoO_4$, $Li_2MoO_4$, $Na_2WO_4$, $K_2WO_4$, $Li_2WO_4$, $Na_3VO_4$, $K_3VO_4$, $Li_3VO_4$, $Na_2CO_3$, $K_2CO_3$, $Li_2CO_3$, $NaNO_3$, $KNO_3$, $LiNO_3$ and mixtures thereof, cobalt is added to the materials, and as a last step the fluxing material is recovered.

3. The method of claim 2 wherein cobalt additive selected from the group consisting of Co, $Co_2O_3$, $Co_3O_4$, CoO and mixtures thereof is added in step (a) and the weight ratio of NiO:fluxing material is between about 1:0.5 to about 1:3.0.

4. The method of claim 2 wherein cobalt additive as cobalt hydroxide is added after hydrolysis of the reaction product comprising $NaNiO_2$.

5. The method of claim 2 wherein cobalt additive as a water soluble cobalt salt is added during hydrolysis of the reaction product comprising $NaNiO_2$.

6. The method of claim 2 wherein cobalt additive as a water soluble cobalt salt is added after hydrolysis.

7. The method of claim 2 wherein cobalt additive as a water soluble cobalt salt is added after applying the battery material to the porous metallic plaque.

8. The method of claim 2 wherein the active battery material contains from about 0.5 to about 3 wt.% unreacted $NaNiO_2$ and the active battery material is dried between about 15° C to 65° C in step (d).

9. The method of claim 8, wherein the mixture in step (b) is heated at a temperature of between about 700° C to about 900° C for between about ½ to 5 hours.

10. The method of claim 8, wherein the reaction product is cooled to a temperature below about 95° C before step (c).

11. The method of claim 8, wherein the active battery material comprises Ni hydroxide forms and the active battery material is washed after hydrolysis until neutral to litmus.

12. The method of claim 11, wherein the active battery material Ni hydroxide forms comprise a material having a stoichimetry of $Ni_3O_4 \cdot 2H_2O$, and the active battery material is applied to the metallic plaque in aqueous slurry form.

13. The method of claim 12, wherein the metallic plaque is between about 90% to 95% porous and comprises relatively smooth contacting metal fibers.

14. The method of claim 13, wherein the metal fibers are diffusion bonded, wherein there is only an interdiffusion of atoms across the fibers interface.

15. A method of making an active battery electrode powder, comprising the steps of:
    a. mixing an admixture of nickel oxide and $Na_2O_2$, in a weight ratio of nickel oxide:$Na_2O_2$ of between about 1:1.20 to about 1:1.60 with an amount of an oxygen containing, alkali metal fluxing material selected from the group consisting of alkali metal molybdates, alkali metal tungstates, alkali metal vanadates, alkali metal carbonates, alkali metal nitrates and mixtures thereof, effective to allow fuse-melting of the nickel oxide and $Na_2O_2$ at temperatures between about 650° C to about 925° C;
    b. heating the admixture at a reaction temperature of between about 650° C to about 925° C, to melt-fuse the admixture and form a reaction product comprising $NaNiO_2$; and
    c. hydrolyzing the reaction product comprising $NaNiO_2$ in water at between 20° C to about 95° C, forming a battery material comprising Ni hydroxide forms.

16. The method of claim 15 wherein the fluxing material is selected from the group consisting of $Na_2MoO_4$, $K_2MoO_4$, $Li_2MoO_4$, $Na_2WO_4$, $K_2WO_4$, $Li_2WO_4$, $Na_3VO_4$, $K_3VO_4$, $Li_3VO_4$, $Na_2CO_3$, $K_2CO_3$, $Li_2CO_3$, $NaNO_3$, $KNO_3$, $LiNO_3$ and mixtures thereof, cobalt additive, selected from the group consisting of Co, $Co_2O_3$, $Co_3O_4$ and CoO and their mixtures is mixed with the nickel oxide and $Na_2O_2$ in step (a) providing a battery material with about 2 wt.% to about 10 wt.% Co based on NiO plus Co content, the battery material is dried between about 15° C to about 65° C after step (c), and the fluxing material is recovered.

17. The method of claim 16 wherein the mixture of nickel oxide, cobalt additive and $Na_2O_2$ is heated at a temperature of between about 700° C to about 900° C for between about ½ to 5 hours.

18. The method of claim 16 wherein the Ni hydroxide forms comprise a material having a stoichiometry of $Ni_3O_4 \cdot 2H_2O$, said material after drying being in crystalline layer form with interlaminar water.

19. The method of claim 18 wherein the crystalline structure of the material after drying has a center of symmetry and layer like —O—Ni—O— structure with water molecules dispersed in interlaminar positions.

20. The method of claim 18 wherein the fluxing material is selected from the group consisting of $Na_2MoO_4$, $K_2MoO_4$, $Na_2CO_3$, $K_2CO_3$, $NaNO_3$, $KNO_3$ and mixtures thereof.

* * * * *